United States Patent [19]
de la Fé

[11] 4,369,986
[45] Jan. 25, 1983

[54] FOLDING STROLLER FOR TRANSPORTING CHILDREN

[76] Inventor: Alicia B. de la Fé, Pi y Margall 63, Las Palmas de Gran Canaria, Spain

[21] Appl. No.: 159,074

[22] Filed: Jun. 13, 1980

[30] Foreign Application Priority Data

Jun. 20, 1979 [ES] Spain ........................... 244.041

[51] Int. Cl.³ ............................................. B62B 11/00
[52] U.S. Cl. ................................ 280/644; 280/647; 280/47.37 R; 297/45; 403/100
[58] Field of Search ................ 280/642, 644, 639, 42, 280/650, 647, 47, 37 R; 297/58, 55, 53, 45; 403/100

[56] References Cited

U.S. PATENT DOCUMENTS

| 1,906,218 | 4/1933 | Patchell | 403/100 |
| 2,490,988 | 12/1949 | Wheeler | 280/650 |
| 3,808,616 | 5/1974 | White | 297/377 X |
| 3,976,309 | 8/1976 | Montanelli | 280/644 |
| 4,108,468 | 8/1978 | Orlanski | 280/650 X |
| 4,132,429 | 1/1979 | Woods | 280/650 X |
| 4,157,839 | 6/1979 | Lahti | 280/650 X |

FOREIGN PATENT DOCUMENTS 394545 6/1933 United Kingdom .
593863 10/1947 United Kingdom .
1341670 12/1973 United Kingdom .

Primary Examiner—Robert J. Spar
Assistant Examiner—Donal W. Underwood
Attorney, Agent, or Firm—Wender, Murase & White

[57] ABSTRACT

A folding stroller for transporting children includes a pair of side rods articulated in the center having curved steering handles at the upper ends and wheels at the lower ends, a first cross rod pivotally connecting the lower ends of the side rods and articulated in the center, a pair of articulated back legs with each leg pivotally connected proximate one end to one of the side rods and provided with a wheel at the opposite end, and a second cross rod pivotally connecting the back legs and articulated in the center. The two rods and two legs together form a frame across which a seat having inflatable cushion inserts is fastened, whereupon folding of the stroller is achieved by the pivoting and articulation of the side rods, cross rods and back legs.

3 Claims, 7 Drawing Figures

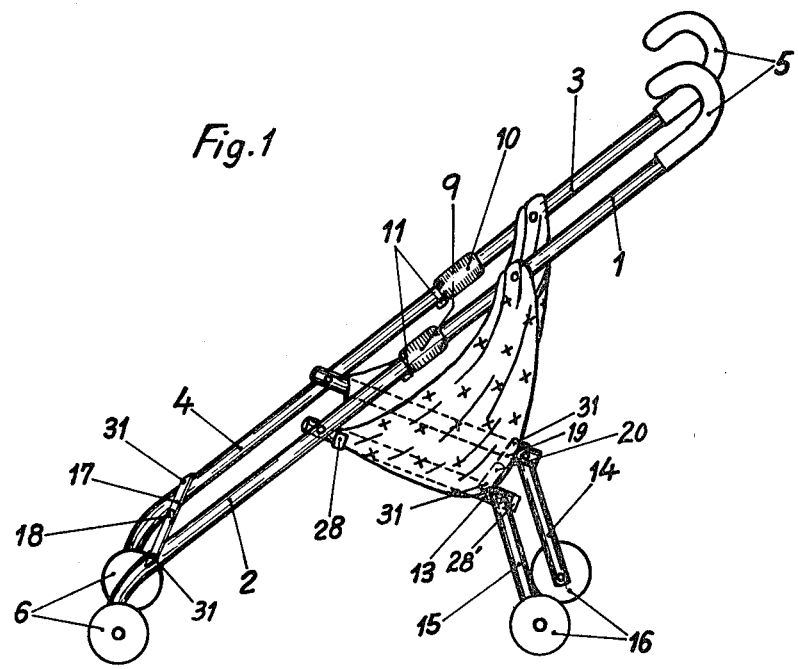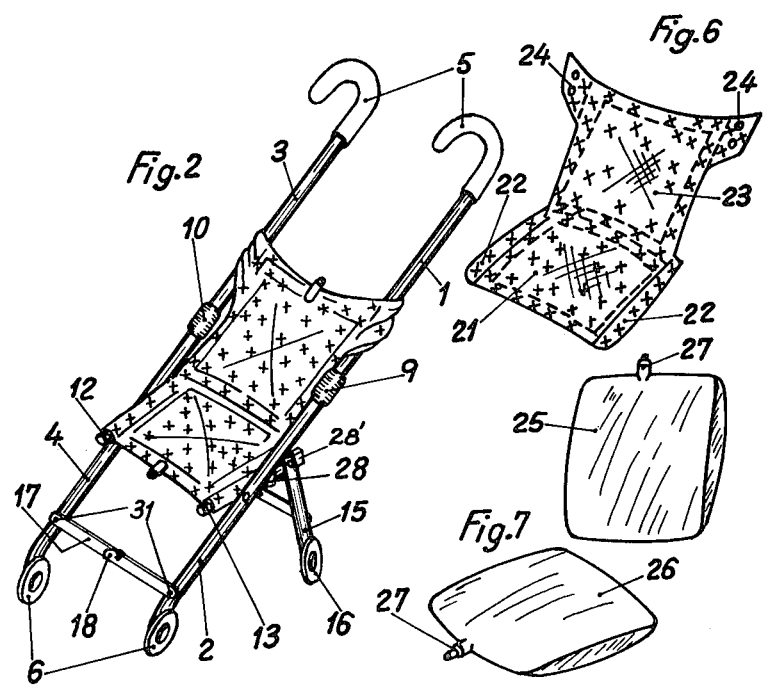

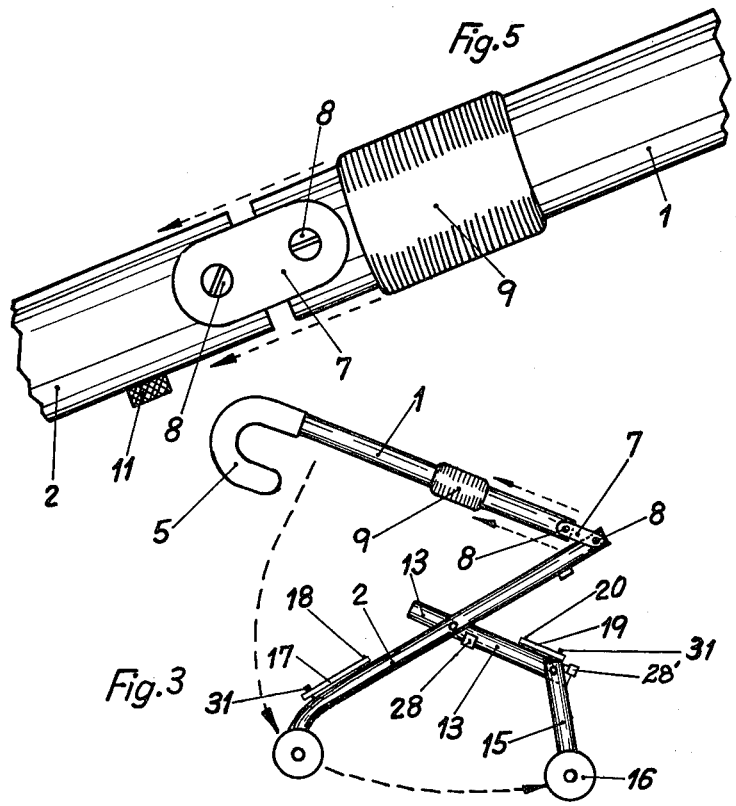
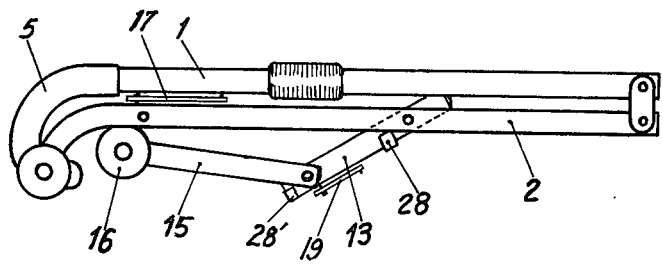

FOLDING STROLLER FOR TRANSPORTING CHILDREN

BACKGROUND OF THE INVENTION

This invention relates to a folding stroller for carrying very young children.

Folding strollers for carrying children have proven to be very practical since the strollers can be folded and put in automobiles or conveniently carried by hand on public transportation such as buses, subways, trains and other crowded places where they could not otherwise be taken unfolded with children sitting in them. However, strollers of this type which are presently known are hard to fold and unfold and have excessive volume and weight.

SUMMARY OF THE INVENTION

To eliminate these drawbacks, the present invention gives to said strollers a new makeup that makes them easier to fold and unfold and much lighter and easier to carry once in the folded position.

The advantageous properties of a stroller for carrying children according to the present invention are achieved by a structure of four aluminum rods, each rod comprising two articulated parts. The two larger rods have curved steering handles on their upper ends and front wheels for moving the stroller on their lower ends. Each of said longer rods is made up of two parts of the same length, articulated to one another by a pair of short metal plates attached to the rods by screws or pins which allow the turning of the plates on the rods so that each general rod can be folded in half such that one rod, when folded, is parallel and adjacent the other rod. To keep the rods rigid and aligned when in their straight unfolded position, a sliding sleeve is put in place axially on the rods so as to encircle the two plates joining the rod halves, thus preventing them from folding, sliding travel of the sleeve being limited by a stop provided on one of the rod halves.

The two longer articulated rods are joined together proximate their lower ends by a cross rod so as to maintain them parallel and separated from one another. This cross rod can be folded in its center and is joined at its ends to the articulated rods so as to be rotatable thereon. With this arrangement, a stretcher is formed to support the seat on which the child sits. Attached to each of the two longer articulable rods, proximate the lower end and in an articulated manner, is a shorter rod, also divided into two articulated parts, the lower end of which is attached to the back wheels of the stroller. These shorter rods are also joined to each other by a cross rod, articulated in its center, so that the two long rods and two short rods constitute a frame that can be kept rigid with both sides parallel and separated by the cross rods, or the said sides can be brought together by folding the cross rods in half in their center. Each of these shorter rods has a side projection to act as a step for the two longer rods that carry the front wheels.

To complement the folding frame described above, a seat made of canvas or a tough fabric of any type and material is provided, in which are made two pockets, each intended to receive an inflatable inner tube of plastic, rubber or other material with a corresponding stem for inflation purposes. The upper pocket has on both sides a flange with means for fastening to the upper rods on both sides and two tubular hems into which the lower rods are introduced, whereby a seat having a bottom and back is constituted.

BRIEF DESCRIPTION OF THE DRAWINGS

FIG. 1 is a side elevation view of a stroller according to the present invention, unfolded and ready for use;

FIG. 2 is another perspective of the stroller of FIG. 1;

FIG. 3 is a side elevation view of the stroller in FIG. 1 in its initial folded position;

FIG. 4 is a side view of a folded stroller.

FIG. 5 is a detailed side view of the central articulation of the long side rods of the stroller of FIG. 1;

FIG. 6 is a perspective view of the seat of a stroller according to the present invention; and FIG. 7 is a perspective view of the two inner tubes that can be housed in the bottom and back of the seat of FIG. 6.

DESCRIPTION OF THE PREFERRED EMBODIMENT

A stroller according to the present invention consists of two long rods divided in two parts 1, 2, 3, 4 which at the upper ends have curved handles 5 used for guiding and at the lower end front wheels 6. The two parts of each rod are joined by two metal plates 7, one on each side of the rod, allotted by pins or screws 8 such that the rods can rotate and be articulated. It is noted that even when the rods are fully extended, the rod parts are kept somewhat separated, as can be seen best in FIG. 5. For the two parts 1 and 2 of one rod, and parts 3 and 4 of the other rod to be kept rigid and straight, each rod has a sliding sleeve 9, 10 that is located on the respective articulated plates 7, striking against stops 11.

The lower parts 2 and 4 of the rods are joined in an articulated manner to rods 12, 13 which in turn are articulated to the two other respective rods 14, 15 carrying back wheels 16 at their ends. Portions 12 and 13 laterally have a projection 28 that acts as a stop for rods 2 and 4 to strike against when the stroller is mounted for use. Similarly, stops 28' are provided on the ends of rods 12 and 13 proximate rods 14 and 15, respectively, so that the latter rods strike against stops 28' when the stroller is unfolded for use.

The two long rods of the frame are joined at their lower sections 2 and 4 by a cross rod 17, with the ends rotating on suitable pins 31. The central point of cross rod 17 is articulated by means of pin 18. In the same way, rods 12 and 13 which constitute the back legs are also joined by a cross rod 19 with ends rotatably mounted on rods 12 and 13 by means of pins 31 and a central pin 20 to provide articulation, thus together constituting a frame suitable for receiving a seat, having a bottom and back in which the child will sit.

Said seat is made of canvas or a tough fabric of any other type and includes a lower pocket 21 provided on both longitudinal sides with two tubular hems 22 and an upper pocket 23 with two flanges 24 equipped with hooking or joining means, as can be seen in FIG. 6. In said pockets 21 and 23 is housed corresponding air cushions 25 and 26 provided with respective stems 27 for inflating and deflating the cushions as desired. The seat is mounted on the frame by introducing rods 12 and 13 into the tubular hems 22, while flanges 24 are fastened to rods 1 and 3 so as to constitute the bottom and back of the seat of stroller on which the child may be placed.

Starting with a stroller that is unfolded and ready for use, as shown in FIGS. 1 and 2, if it is desired to fold the stroller, all that will be required is to move tubular sleeves 9 and 10 upward onto rod sections 1 and 3, whereby the long side rods can be folded in their center by articulation of metal plates 7; parts 1 and 3 thus fold over onto parts 2 and 4. In due time, legs 14 and 15 are also folded and cross rods 17 and 19 are folded via their center pins 18 and 20, respectively, whereby the stroller is folded as FIG. 4 shows. To facilitate folding in this manner, cushions 25 and 26 should be deflated by opening stems 27.

The example described above and represented in the accompanying drawings can be made in a variety of sizes, shapes and materials and with various types of additional elements.

I claim:

1. A folding stroller for transporting children, comprising:

two side rods providing support for a seat, each of said side rods having a lower portion provided with a wheel and a separate upper portion provided with a steering handle;

metal plates connecting said lower and upper portions of each of said side rods, two said plates being pivotally connected tangentially to each of said portions proximate the ends of said portions opposite said wheel and said steering handle, such that the articulated ends of said portions remain separated;

a movable sleeve positioned over each pair of said plates on said side rods so as to maintain said upper and lower portions in rigid axial alignment, said sleeves being retractable from said plates by sliding onto said upper portions;

a stop connected to each of said lower portions proximate said metal plates so as to maintain said sleeves in position about said plates; and a first cross rod rotatably connecting said lower portions of said side rods, said first cross rod being divided into two pivotally articulated sections, whereby the stroller can be folded and unfolded by articulation of said first cross rod and said side rods and movement of said sleeves.

2. A folding stroller as recited in claim 1, further comprising:

two back legs, each being pivotally joined proximate one end thereof to one of said side rods and having a wheel provided at the other end, each of said legs being articulated into two pivotal sections;

a second cross rod rotatably connecting said back legs, said second cross rod being divided into two pivotally articulated sections; and said back legs having a plurality of side projections to act as stops for the pivoting of said back legs about said side rods and for the articulation of said back legs during unfolding of the stroller.

3. A folding stroller as recited in claim 1 or claim 2, wherein said seat has a back portion and a bottom portion, said back portion being connected to said side rods and said bottom portion being connected to said back legs, said back and bottom portions each having a pocket in which an inflatable cushion is placed, whereby said cushions are deflated to facilitate folding of the stroller.

* * * * *